Reissued Aug. 5, 1930

Re. 17,762

UNITED STATES PATENT OFFICE

CHARLES S. REEVE, OF LEONIA, NEW JERSEY, ASSIGNOR TO THE BARRETT COMPANY, A CORPORATION OF NEW JERSEY

PLASTIC COMPOSITION

No Drawing. Original No. 1,643,520, dated September 27, 1927, Serial No. 531,467, filed January 24, 1922. Application for reissue filed September 26, 1929. Serial No. 395,451.

This invention relates to bituminous compositions of various consistencies which may serve a variety of purposes such as in the production of paving and roofing compounds, waterproof paints, coatings and saturants, rubber compounds, floorings, etc. It deals particularly with a means of so modifying the character of pitches and more especially coal tar pitches as to render them more desirable than they ordinarily would be for the purposes above enumerated.

A well known characteristic of tar pitches such as those obtained as residuals from the fractional distillation of coal tars and water-gas tars, is their relatively high susceptibility to changes in temperature. In other words, a given pitch may vary in consistency from a brittle solid at freezing temperature to a viscous fluid at extremely high summer temperatures. Residual asphalts obtained by the distillation of petroleum also possess this characteristic to a great extent, but with them, the susceptibility is materially reduced by "blowing" or passing a required amount of air through them at high temperatures. Such treatment, is however, relatively ineffective on tar pitches on account of the different properties of the hydrocarbons contained in such pitches as compared with those in petroleum residuals. For many purposes, it is desirable to have a bituminous material that is, relatively, only slightly susceptible to temperature changes, in other words, a material that will show a relatively slight change in consistency in passing through the temperature range to which it will be exposed. It is also desirable to have the property of strongly adhering to minerals and metal surfaces. This property is characteristic of coal tar pitches as distinguished from blown asphalts.

A rubbery or elastic character is an additional desideratum which tar pitches do not possess in that a slab of pitch when bent or twisted will not of itself straighten out or recover its original form.

I have discovered that new products or compositions of matter in which coal tar pitches predominate may be prepared to meet the above requirements by digesting such pitches with oil shales in a manner hereinafter described. These shales consist essentially of mineral matter, usually argillaceous, and a combination of hydrocarbons, commonly termed kerogen, which latter upon heating to temperatures which differ somewhat with shales from different localities, is converted into bitumen. If the heating of these shales is carried out in a retort, it is the common practice to carry the temperature beyond the point of formation of bitumen, in which case the bitumen is destructively distilled with the production of shale oil, which may be later distilled and refined for the production of various grades of oils and wax. A composition of matter satisfactory for many purposes may be obtained by holding the shale at or near the temperature at which the kerogen is converted to bitumen while being agitated with the tar product with which combination is desired.

The following is given as a specific example illustrative of my invention, although it is understood that I may use a great variety of tars, oils or pitches and shales, and that I may vary the proportions, time and temperature of treatment to produce the desired product without departing from the spirit of my invention.

I may take 2 parts of a coal tar pitch having a melting point of 145° F. (American Society for Testing Materials standard method D-61-20) and 1 part of a Colorado oil shale having approximately 50% volatile matter (American Society for Testing Materials standard method D-22-16). The shale is preferably crushed to a size that will pass a 10 mesh sieve although it is possible to accomplish my purpose with larger size particles. The materials in the above proportions are placed in a metal still or kettle provided with a mechanical stirrer or agitator and a condenser with a receiver for any small amount of distillate that may be evolved, heated to a temperature of approximately 300° C. to 400° C. preferably about 350° C., and maintained at that temperature for approximately 7 hours while being continually stirred. I have found the optimum temperature to vary with different shales. Some Nevada shales, for instance, would require a temperature of 310°–320° C. for similar results. At the end of this period, it will be found that the shale has decomposed as evidenced by the fact that the particles have lost their shape, that the mineral matter has gone into a state of very fine dispersion with practically no evidence of grit, and that the bitumen formed has entered into combination with the bitumen of the pitch. The product may be rendered more homogeneous if desired by passing through rolls. I may flux or "cut-back" this bitumen with a high boiling coal tar distillate to any desired melting point and will have a composition of matter possessing new and valuable characteristics not hitherto obtainable with coal tar pitches. For illustration, the following comparison is offered between an ordinary coal tar pitch and a product of substantially the same penetration at normal temperature (A. S. T. M.—D-5-21) prepared by my process.

| | Coal tar pitch | Pitch shale mixture |
|---|---|---|
| Penetration (0° C., 200 gms., 1 min.) | 2.8 | 4 |
| Penetration (25° C., 100 gms., 5 secs.) | 38.8 | 40 |
| Penetration (46.5° C., 50 gms., 5 secs.) | Over 300 | 239 |
| Melting point (°F.) | 131.0 | 151 |

The difference is even more clearly shown by what is commonly termed a slide test, in which cubes of the material are placed side by side in the corrugations of an inclined plate maintained at a constant temperature of 40° C., (Jour. Ind. & Eng. Chem., Oct. 1918). Under such conditions the coal tar pitch will flow the length of the plate (6 inches) in 3 hours, whereas the pitch shale mixture will flow but 1¼″ in 7 hours.

Another characteristic of the products prepared by my process is their elasticity or resiliency as compared with coal tar pitches of the same melting point. The former when suddenly bent or stretched tend to immediately reassume their original shape when released which is a characteristic entirely absent from coal tar pitches.

As another example, I may take a mixture of dehydrated coal tar with a predetermined amount of shale and digest this mixture while agitating same in a still with slowly rising temperature and evolution of distillate until the desired temperature for final decomposition of the shale is reached. By then holding the mass at this temperature for a proper length of time, I can obtain pitches of greatly reduced susceptibility to temperature changes in comparison with those ordinarily obtained from coal tar.

I have also found that cannel coal which is a mineral substance containing hydrocarbons when heated with pitches in a manner similar to that described for oil shale modifies the character of such pitches to some extent, but the effect is not so marked as when oil shale is used.

Compositions of the character described may have a variety of uses. They have the property of strongly adhering to iron and may be applied hot as coatings without a primer coat where a certain amount of flexibility at ordinary temperatures with resistance to flow at slightly elevated temperatures is required. They are resistant to weather and to moderately strong alkalies and may, therefore, be used as a base for bituminous paints. Their relatively low susceptibility to temperature changes and strong adhesive qualities make these compositions particularly adapted to built up roofing in construction where there would be a tendency for other bituminous materials to flow. The same qualities render the aforesaid compositions particularly applicable as paving joint fillers. They may also be mixed with asbestos, ground cork, or other aggregates to make useful products, for example to form a suitable mastic for a resilient flooring. It is readily understood that no single product will be adapted to all these uses, but the basic principle of all these compositions will be the same, and the finer differences must be obtained by variations in the proportions of the components and by control of the reaction temperature in their preparation. In general the products find usefulness in all fields where bituminous materials are applicable and the variations of proportions of shale and tar product, the temperature and time of digestion and the final melting point of the product are all within the skill of the chemist familiar with bituminous materials, depending on the purpose for which the final product is to be used.

As specifically disclosed in my copending application Serial No. 531,468, filed January 24, 1922 (Patent No. 1,643,521) coal tar oil may be used in accordance with my invention in place of pitch and the term "bitumen" as used in the appended claims is intended to include coal tar oil.

I claim:

1. A composition of matter comprising bitumen and substantially all of the decomposition products of an oil shale that has been decomposed while in intimate contact with said bitumen.

2. A composition of matter comprising coal tar pitch and substantially all of the decomposition products of an oil shale that has been decomposed while in intimate contact with said pitch.

3. A composition of matter comprising the residuum product resulting from the heating of a mixture of coal tar pitch and oil shale to the decomposition temperature of said shale, said residuum product containing substantially all of the decomposition products of said shale.

4. A composition of matter comprising the residuum product resulting from the heating of a mixture of coal tar pitch and oil shale to the decomposition temperature of said shale, said residuum product containing substantially all of the decomposition products of said shale, the mineral matter in said composition being finely divided.

5. The process of making a bituminous product which comprises heating oil shale in the presence of a bitumen to a temperature at which the kerogen in the oil shale will decompose and continuing said heating for a time without permitting substantial distillation of the mixture.

6. A composition of matter comprising about two parts coal tar pitch and substantially all of the decomposition products of one part oil shale that has been decomposed while in intimate contact with said pitch.

7. A composition of matter comprising a bitumen, substantially all of the decomposition products of an oil shale that has been decomposed while in intimate contact with said bitumen, and a coal tar distillate.

8. A composition of matter comprising coal tar pitch, substantially all of the decomposition products of an oil shale that has been decomposed while in intimate contact with said pitch, and a coal tar distillate.

9. A composition of matter comprising a bitumen, substantially all of the demoposition products of an oil shale that has been decomposed while in intimate contact with said bitumen, and a coal tar distillate, the mineral matter in said composition being finely divided.

10. The process of making bituminous products which comprises heating a mixture of two parts coal tar pitch and one part oil shale at a temperature which is above that required to decompose the kerogen in said shale and below that at which an appreciable amount of distillation will take place.

11. The process of making bituminous products which comprises heating a mixture of coal tar pitch and oil shale until a temperature is reached which is above that required to decompose the kerogen in said shale and below that at which an appreciable amount of distillation will take place.

12. The process of making bituminous products which comprises heating a mixture of coal tar pitch and an oil shale at a temperature of approximately 340° to 350° C. for about five to ten hours.

13. The process of producing a bituminous composition, which comprises digesting oil shale with coal tar pitch, at such a temperature that decomposition of said shale and the combination of its decomposition products with said pitch, occurs simultaneously, without substantial distillation of the mixture.

14. The process of making bituminous products, which comprises heating a mixture of coal tar pitch and oil shale, until a temperature is reached which is above that required to decompose the kerogen of said shale, and continuing said heating for a time without substantial distillation of the mixture.

15. The production of a bituminous composition, which comprises digesting oil shale with coal tar pitch, at such a temperature that decomposition of said shale and the combination of its decomposition products with said pitch occurs simultaneously, and maintaining said temperature for a time without permitting substantial distillation of the mixture.

16. A composition of matter comprising the product produced by decomposing a hydrocarbon-containing mineral substance at an elevated temperature while in intimate contact with bitumen and containing substantially all of the mineral constituents of said hydrocarbon-containing mineral substance, said product being characterized by a substantially lower susceptibility to temperature change than ordinary pitch, and characterized by a lower penetration test at a given temperature substantially above 25° C. as compared to the penetration test at the same temperature of an ordinary pitch which gives at 25° C. the same penetration test as the said product gives at 25° C.

17. A composition of matter comprising the product produced by decomposing a hydrocarbon-containing mineral substance at an elevated temperature while in intimate contact with bitumen and containing substantially all of the decomposition products of said hydrocarbon-containing mineral substance, said product being of resilient nature, characterized by a substantially lower susceptibility to temperature change than ordinary pitch, and characterized by a lower penetration test at a given temperature substantially above 25° C. as compared to the penetration test at the same temperature of an ordinary pitch which gives at 25° C. the same penetration test as the said product gives at 25° C.

18. A composition of matter which comprises the product produced by decomposing while in intimate contact with bitumen at an elevated temperature a mineral substance which yields substantial amounts of bitumen on decomposition, said product being of resilient nature, characterized by a substantially lower susceptibility to temperature change than ordinary pitch, and characterized by a lower penetration test at a given temperature substantially above 25° C. as compared to the penetration test at the same temperature of an ordinary pitch which gives at 25° C. the same penetration test as the said product gives at 25° C.

19. The process of making bituminous products which comprises digesting a mixture of bitumen and hydrocarbon-containing mineral substance at a temperature not substantially lower than 300° C. to cause decomposition of the said mineral substance while in contact with said bitumen, whereby a bituminous product is produced characterized by a substantially lower susceptibility to temperature change than ordinary pitch and characterized by a lower penetration test at a given temperature substantially above 25° C. as compared to the penetration test at the same temperature of an ordinary pitch which gives at 25° C. the same penetration test as the said product gives at 25° C.

20. The process of making bituminous products which comprises decomposing while in intimate contact with bitumen at a temperature within the range of substantially 300–400° C. a mineral substance which yields substantial amounts of bitumen on decomposing whereby a product of resilient nature is produced characterized by a substantially lower susceptibility to temperature change than ordinary pitch, and characterized by a lower penetration test at a given temperature substantially above 25° C. as compared to the penetration test at the same temperature of an ordinary pitch which gives at 25° C. the same penetration test as the said product gives at 25° C.

In testimony whereof I hereunto affix my signature.

CHARLES S. REEVE.